United States Patent [19]

Ichishita et al.

[11] Patent Number: 5,002,593
[45] Date of Patent: Mar. 26, 1991

[54] COMPRESSED-AIR DRYER

[75] Inventors: Yuzo Ichishita, Yokohama; Katsumi Kojima, Yokosuka, both of Japan

[73] Assignee: Nippon Air Brake Co., Ltd., Hyogo, Japan

[21] Appl. No.: 480,803

[22] Filed: Feb. 16, 1990

[30] Foreign Application Priority Data

Feb. 22, 1989 [JP] Japan ............................. 1-20544[U]
May 26, 1989 [JP] Japan ............................. 1-61549[U]

[51] Int. Cl.⁵ ............................................. B01D 50/00
[52] U.S. Cl. .................................. 055/218; 055/267;
055/316; 055/337; 055/387
[58] Field of Search ................ 55/218, 267, 316, 337, 55/387

[56] References Cited

U.S. PATENT DOCUMENTS

| | | | |
|---|---|---|---|
| 4,131,442 | 12/1978 | Frantz | 55/387 |
| 4,487,617 | 12/1984 | Dienes et al. | 55/387 |
| 4,544,385 | 10/1985 | Tanaka | 55/218 |
| 4,655,801 | 4/1987 | Kojima et al. | 55/218 |
| 4,673,419 | 6/1987 | Kojima | 55/218 |
| 4,713,094 | 12/1987 | Yanagawa et al. | 55/316 |
| 4,892,569 | 1/1990 | Kojima | 55/218 |

Primary Examiner—Bernard Nozick
Attorney, Agent, or Firm—Kane, Dalsimer, Sullivan, Kurucz, Levy, Eisele and Richard

[57] ABSTRACT

In a compressed-air dryer, a base has formed therein a recess at the other end thereof. An inlet port is connected to an air compressor and communicates with the recess. An outlet port is connected to an air reservoir. Air after having passed through a desiccant container is discharged to the air reservoir through the outlet port. An oil-mist separator has one end thereof communicating with the inlet port through the recess. The other end of the oil-mist separator communicates with the desiccant container. The oil-mist separator is received within a tubular section of the base and cooperates with the tubular section to define a transport cavity therebetween. The inlet port communicates with the oil-mist separator thorugh the transport cavity and the recess.

17 Claims, 4 Drawing Sheets

COMPRESSED-AIR DRYER

BACKGROUND OF THE INVENTION

The present invention relates to a compressed-air dryer which is used in a pneumatic pressure circuit utilizing compressed air as a source of pressure, for example, in an air brake circuit for an automotive vehicle or the like.

A compressed-air dryer of the kind referred to above normally uses regenerable desiccant material. An important enemy for the desiccant material is oil discharged from an air compressor, particularly, oil mist therein. Conventionally, as a countermeasure for the oil mist, such a technique is known that an oil-mist separator for removing the oil mist is arranged midway of a line which connects the air compressor to the compressed-air dryer, as disclosed in Japanese Utility Model Provisional Publication Nos. SHO 63-133321 and SHO 63-157234.

Further, in order to improve attachment, connection and so on of various lines, such a technique has been proposed that an oil-mist separator is arranged within a compressed-air dryer. That is, the applicant of this invention has already filed Japanese Utility Model Application No. SHO 63-166365 which discloses a compressed-air dryer. In the compressed-air dryer, a desiccant container is arranged within a housing and cooperates with the latter to define an air receiving cavity therebetween. The desiccant container has accommodated therein regenerable desiccant material. A base has one end thereof which is mounted to an open end of the housing to close the latter. The base has formed therein a recess at the other end thereof and has an inlet port which is connected to an air compressor of a pneumatic pressure circuit. The inlet port communicates with the recess. An outlet port is provided in one of the housing and the base and is connected to the air reservoir. The outlet port communicates with the air receiving cavity so that air after having passed through the desiccant container is discharged from the air receiving cavity to an air reservoir of the pneumatic pressure circuit through the outlet port. A dump valve is arranged at the other end of the base for causing the recess in the base to communicate with the ambient atmosphere in response to a command from the outside. An oil-mist separator is arranged between the desiccant container and the dump valve. The oil-mist separator has one end thereof communicating with the inlet port of the base through the recess therein. The other end of the oil-mist separator communicates with the desiccant container. The oil-mist separator removes oil in compressed air flowing from the air compressor toward the desiccant container through the inlet port and the recess.

Since, in the above compressed-air dryer, the inlet port communicates with the oil-mist separator substantially directly, the following problems arise. That is, oil droplets contained in the compressed air supplied from the air compressor enter or invade directly into the oil-mist separator so that premature deterioration occurs in the oil-mist separator. Furthermore, since the compressed air passes through the oil-mist separator under such a condition that heat generated at compression of air is not reduced sufficiently, absorption efficiency of the desiccant material, in other words, drying efficiency thereof decreases. In this respect, as disclosed in U.S. Pat. No. 4,487,617, it has been suggested that a circuitous passage is defined at the recess communicating with the inlet port to beforehand remove large oil droplets and so on, that is, before the compressed air reaches the oil-mist separator. This suggestion, however, is yet insufficient as a countermeasure for oil.

Further, as described above, the oil-mist separator is arranged between the desiccant container disposed within the housing and the dump valve disposed at the other end of the base. With the arrangement, the oil-mist separator must be mounted to and dismounted from the one end or upper end of the base.

At maintenance of the compressed-air dryer, replaced are the desiccant material within the desiccant container and a mesh element within the oil-mist separator, or the desiccant container per se containing the desiccant material and the oil-mist separator per se containing the mesh element. In this case, the desiccant container and the oil-mist separator must be mounted to and dismounted from the upper end of the base in the same direction. Accordingly, the end face of the base at the one end thereof is contaminated by the mesh element which sucks the oil. Moreover, it is not necessarily limited that the desiccant material and the mesh element are replaced simultaneously. For example, there is a case where only the mesh element is replaced. At replacement of the mesh element, in spite of the fact that only the oil-mist separator should be removed or detached, the desiccant container is also demounted. Thus, operability of the replacement is low.

SUMMARY OF THE INVENTION

It is therefore an object of the invention to provide a compressed-air dryer capable of separating or removing oil from compressed air and capable of improving drying efficiency of desiccant material.

It is another object of the invention to provide a compressed-air dryer which facilitates maintenance of an oil-mist separator arranged within a housing.

For the purpose, according to the invention, there is provided a compressed-air dryer for use in a pneumatic pressure circuit having an air compressor and an air reservoir, the compressed-air dryer comprising:

a desiccant container having accommodated therein regenerable desiccant material;

base means having formed therein a recess at one end thereof;

inlet port means connected to the air compressor of the pneumatic pressure circuit and communicating with the recess;

outlet port means through which air after having passed through the desiccant container is discharged to the air reservoir of the pneumatic pressure circuit;

dump valve means arranged at the one end of the base means for causing the recess in the base means to communicate with the ambient atmosphere in response to a command from the outside; and an oil-mist separator arranged between the desiccant container and the dump valve means, the oil-mist separator having one end thereof communicating with the inlet port means through the recess therein, the oil-mist separator having the other end communicating with the desiccant container, in which the oil-mist separator removes oil in compressed air flowing from the air compressor toward the desiccant container through the inlet port means and the recess, wherein the base means has a tubular section, the oil-mist separator being received within the tubular section and cooperating with the latter to define a transport cavity therebetween, and wherein the inlet port means communicates with the one end of the oil-mist separator through the transport cavity and the recess.

With the arrangement described above, the compressed air supplied into the inlet port means from the air compressor passes through the transport cavity defined between the oil-mist separator and the tubular section of the base means and, subsequently, is supplied through the recess, to the oil-mist separator from its end which is located adjacent the dump valve means. Accordingly, oil droplets and the like contained in the compressed air adhere to an inner peripheral surface of the tubular section or an outer peripheral surface of the oil-mist separator and a wall surface of the recess so that the oil droplets are prevented from invading directly into the oil-mist separator. Thus, it can be prevented that oil removing capability of the oil-mist separator is deteriorated prematurely. Further, during passage of the compressed air through the transport cavity, the compressed air is heat-exchanged through the annular section of the base means so that the compressed air is cooled. Thus, an absorption efficiency or a drying efficiency of the desiccant material within the desiccant container can be improved.

Preferably, the base means includes a tubular body having the tubular section and a cap member. The tubular section of the base means has an open end which is located adjacent the cap member and which has an opening. The cap member is detachably mounted to the open end of the tubular section. The cap member has defined therein the recess. The dump valve means is incorporated in the cap member. In assembling, the oil-mist separator passes through the opening in the open end of the tubular section and is detachably arranged in position within the tubular section.

With the above arrangement, the desiccant container is mounted to and demounted from the base means from a first direction toward and away from the one end of the base means, and the oil-mist separator is mounted to and demounted from the base means from a second direction which is opposite to the first direction and which passes through the other end of the base means. In other words, the cap member having incorporated therein the dump valve means is detachably mounted to the base means. Thus, replacement of the oil-mist separator within the base means can be done separately from the desiccant container so that replacement operability is improved.

DETAILED DESCRIPTION

Figure 1:
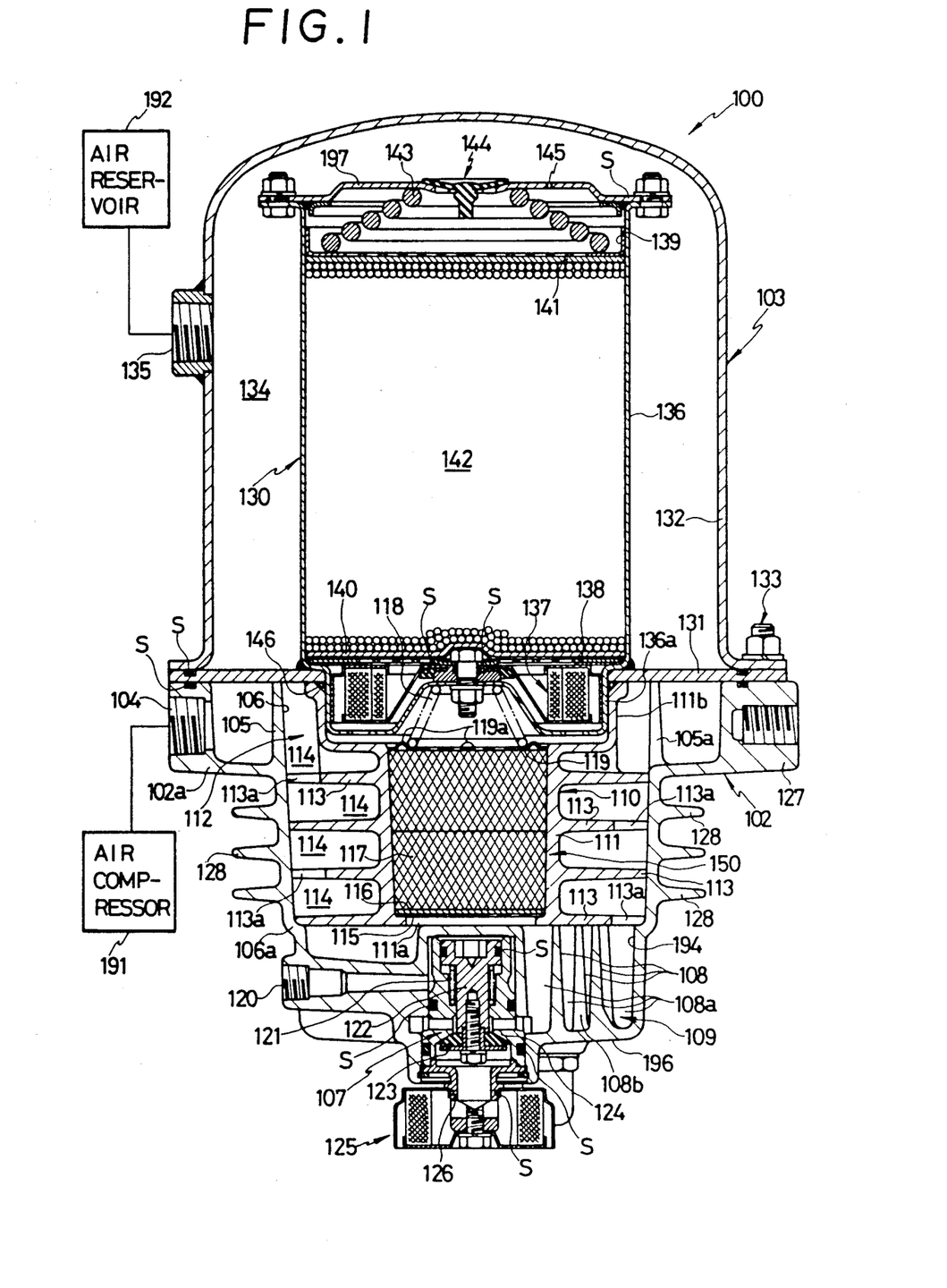
FIG. 1 is a longitudinal cross-sectional view of a compressed-air dryer according to a first embodiment of the invention.

Referring to FIG. 1, there is shown a compressed-air dryer, generally designated by the reference numeral 100, for use in a pneumatic pressure circuit, for example, in an air brake circuit for an automotive vehicle. The pneumatic pressure circuit has an air compressor 191 and an air reservoir 192. The compressed-air dryer 100 comprises an end cover or a base 102 and a drying section 103.

The drying section 103 includes a housing 132 which has an open end. A dryer unit or desiccant container 130 is arranged within the housing 132 and cooperates with the latter to define a purge cavity or air receiving cavity 134 therebetween. The desiccant container 130 has accommodated therein a drying agent or regenerable desiccant material (molecular sieve) 142.

The base 102 has one end thereof which is mounted to the open end of the housing 132 to close the latter. The base 102 includes a tubular body 102a and an end wall 196 which is substantially closed and which is formed in integral with the tubular body 102a to close one end thereof. A recess 194 is defined at the closed end wall 196. The tubular body 102a of the base 102 has, at its lateral side, an inlet port 104 which is connected to the air compressor 191. The tubular body 102a has a tubular section 105 coaxial with the housing 132. The tubular section 105 has its inner peripheral surface which defines a bore 106. An oil-mist separator 150 is received within the bore 106 in the tubular section 105 and cooperates with the latter to define a transport cavity 112 therebetween. The inlet port 104 communicates with the transport cavity 112 through a cut-out 105a formed in an end of the tubular section 105 which is located at the open end of the housing 132. The cut-out 105a is located at a position diametrically opposite to the inlet port 104. Thus, the inlet port 104 communicates with the oil-mist separator 150 through the transport cavity 112 and the recess 194.

A dump valve 107 is arranged at the center of a bottom wall of the closed end wall 196 for causing the recess 194 to communicate with the ambient atmosphere in response to a command from the outside. A circuitous passage 109 is defined within the recess 194 in the closed end wall 196. The inlet port 104 communicates with the oil-mist separator 150 through the transport cavity 112 and the circuitous passage 109. The circuitous passage 109 is defined by a plurality of semi-circular rims 108 which extend from the bottom wall of the closed end wall 196 toward the oil-mist separator 150. A plurality of passage segments 108a defined respectively between the semi-circular rims 108 communicate with each other through a plurality of cut-outs 108b which are alternately formed at the ends of the respective semi-circular rims 108. Accordingly, the passage segments 108a defined between the semi-circular rims 108 communicate with each other to form the circuitous passage 109 by which the passage segments 108a communicate with each other from the radially outermost passage segment 108a to the radially innermost passage segment 108a.

A support member 110 is arranged within the tubular section 105 of the base 102, for supporting the oil-mist separator 150. The support member 110 has a tubular body 111 which is concentric with the tubular section 105 of the base 102. The tubular body 111 cooperates with the tubular section 105 of the base 102 to define therebetween the transport cavity 112 which is annular in shape. The oil-mist separator 150 is received within the annular body 111 of the support member 110. That is, the oil-mist separator 150 is arranged between the desiccant container 130 and the dump valve 107. The oil-mist separator 150 has one end thereof which communicates with the inlet port 104 of the tubular body 102a through the recess 194 therein. The oil-mist separator 150 has the other end which communicates with the desiccant container 130. The oil-mist separator 150 removes oil in compressed air flowing from the air compressor 191 toward the desiccant container 130 through the inlet port 104, the transport cavity 112 and the recess 104.

The support member 110 has a plurality of annular fins 113 which are spaced from each other along an axis of the tubular body 111 of the support member 110. The annular fins 113 extend in parallel relation to each other. The annular fins 113 extend radially outwardly from the tubular body 111 toward the tubular section 105 of the base 102 perpendicularly to the axis of the tubular body 111. The annular fins 113 cooperates with the inner peripheral surface of the annular section 105 to divide the transport cavity 112 into a plurality of continuous passages or chambers 114 which communicate with each other through cut-outs 113a. The cut-outs 113a are formed respectively in the annular fins 113 at alternate locations diametrically opposite to each other.

The first one of the chambers 114, which is located adjacent the desiccant container 130, communicates with the inlet port 104 through the cut-out 105a, while the last one of the chambers 114, which is located adjacent the dump valve 107, communicates with the one end of the oil-mist separator 150 through the recess 194. In other words, the lowermost annular fin 113 is abutted against a step 106a between the annular section 105 and the closed end wall 196 and against upper surfaces of the respective semi-circular rims 108. Through the cut-out 113a formed in the lowermost annular fin 113, the lowermost chamber 114 communicates with the radially outermost section of the circuitous passage 109. The radially innermost section of the circuitous passage 109 communicates with a central bore 111a formed in the lower end wall of the annular body 111, and communicates with the dump valve 107. In this connection, the annular fins 113 have their respective outer peripheral edges which are in contact with the inner peripheral surface of the annular section 105 of the base 102. This is preferable. However, it is unnecessary that the outer peripheral edges of the respective annular fins 113 are in contact with the inner peripheral surface of the annular section 105, but slight gaps may be defined or remain between the outer peripheral edges of the respective annular fins 113 and the inner peripheral surface of the annular section 105.

The oil-mist separator 150 comprises a perforated plate 115, a felt 116, a mesh material or element 117 such as crushed aluminum. These components are arranged in order from the side of the central bore 111a, and are biased, through a perforated plate 119, by a coil spring 118 which is arranged between the oil-mist separator 150 and the desiccant container 130. Thus, the oil-mist separator 150 is biased as a whole such that the lowermost annular fin 113 is abutted against the step 106a under the biasing force of the coil spring 118. The perforated plate 119 is formed, by press-molding, with a plurality of projections 119a for positioning the coil spring 118.

The dump valve 107 per se is the same in function and construction as that disclosed in, for example, Japanese Utility Model Provisional Publication No. SHO 63-118929. Accordingly, the dump valve 107 will briefly be described. Pressure of compressed air supplied to a main tank or the air reservoir 192 from the compressed-air dryer 100 reaches a first predetermined value, the compressed air is fed into a port 120 from a governor (not shown). A valve piston 122 is moved downwardly against a biasing force of a coil spring 121 to move a valve element 123 away from its valve seat 124. Thus, the radially innermost section of the circuitous passage 109, in other words, the transport cavity 112 communicates with the ambient atmosphere. When the pressure within the main tank reaches a second predetermined value which is lower than the first predetermined value, the governor is switched to its exhaust position so that the compressed air from the port 120 is discharged to the ambient atmosphere. The valve piston 122 is moved upwardly under the biasing force of the coil spring 121 so that the valve element 123 is seated against the valve seat 124. Thus, communication between the circuitous passage 109 and the ambient atmosphere is intercepted. In this connection, a silencer 125 is mounted, at the side of the ambient atmosphere, to an exhaust coupling 126 which is arranged on the outside of the dump valve 107.

The base 102 constructed as above is fixedly mounted to an automotive vehicle body, through bolts (not shown), by an attaching section 127 which is formed at the base 102 at a location diametrically opposite to the inlet port 104. The base 102 has a plurality of cooling fins 128 which are spaced from each other along an axis of the tubular section 105. The cooling fins 128 extend radially outwardly from the entire outer peripheral surface of the tubular section 105 perpendicularly to the axis thereof. The cooling fins 128 extend in parallel relation to each other. Particularly, the tubular section 105 and the cooling fins 128 of the base 102 are integrally molded and are made of metal high in heat conductivity such as aluminum or its alloy. Similarly, the tubular body 111 and the annular fins 113 of the support member 110 are integrally molded and are made of material the same as that of which the base 102 is made. In this connection, the cooling fins 128 may be continuous peripherally. Further, it is needless to say that a single helical fin may be substituted for the plurality of cooling fins 128. The helical fin extends helically about the outer peripheral surface of the tubular section 105 of the base 102.

A plate 131, to which the desiccant container 130 is welded, and the housing 132 covering the desiccant container 130 as a whole, are fixedly mounted to the one end of the base 102 by utilization of bolt/nut assemblies 133.

The air receiving cavity 134 is defined between the housing 132 and the desiccant container 130 for storing the compressed air for regeneration. The air receiving cavity 134 communicates with a check valve (not shown) of the air reservoir 192 through an outlet port 135. The outlet port 135 is formed in the housing 132, and is connected to the air reservoir 192. The outlet port 135 communicates with the air receiving cavity 134 so that air after having passed through the desiccant container 130 is discharged from the air receiving cavity 134 to the air reservoir 192 through the outlet port 135.

Compressed air flowing from the air compressor 191 into the cavity 112 is air before processing, and includes moisture or water and oil. On the other hand, the compressed air after processing, which is discharged into the air reservoir 192 through the outlet port 135 is dry air from which the water and oil are removed. The dry air supplied to the air reservoir 192 is used for operation of an air-brake system, for example.

The desiccant container 130 is the same in function and construction as that disclosed in the aforementioned Japanese Utility Model Provisional Publication No. SHO 63-118929, therefore, the detailed description of the desiccant container 130 will be omitted. However, the desiccant container 130 will briefly be described. The desiccant container 130 comprises an annular body 136. An oil filter 137 is fixedly mounted to a lower end of the annular body 136. The desiccant material 142 is clamped between a pair of spaced perforated plates 138 and 139 and between a pair of spaced gas-permeable sheets 140 and 141, and is arranged on the oil filter 137. The desiccant material 142 has its upper end which is biased under a biasing force of a coil spring 143. An end cover 197 is mounted to an upper end of the annular body 136 at a location above the upper end of the desiccant material 142. A check valve 144 is mounted to the end cover 197, and a regenerating restriction 145 is formed in the end cover 197. Here, the oil filter 137 is arranged within the desiccant container 130. However, the oil filter 137 has a filter element in the form of a ring made of paper or cloth to filter fine mist. On the other hand, the oil-mist separator 150 condenses mist which hits the mesh element 117, and causes the mist to adhere thereto, thereby removing the mist. Accordingly, in place of the mesh element 117 in the oil-mist separator 150, a plurality of small balls made of plastic material can be utilized.

The desiccant container 130 has, at its lower-end, a diameter-reduced section 136a which is fitted, through a seal element 146, in a diameter-increased section 111b formed at the upper end of the tubular body 111 of the support member 110.

In connection with the above, various seal elements are designated by the reference numerals S.

The operation of the compressed-air dryer 100 will be described below.

First, it is assumed that the pressure within the main tank is lower than the first predetermined value and higher than the second predetermined value and that the air compressor 191 is during loading. Thus, the governor is in the exhaust position, and the compressed air is not supplied to the port 120.

Under this condition, since the dump valve 107 is closed, the compressed air supplied to the inlet port 104 flows along the upper portion of the tubular section 105 and is introduced into the annular cavity 112 through the cut-out 105a. The compressed air flows into the annular cavity 112 with respect to the uppermost one of the four chambers 114 in the illustrated embodiment. The incoming compressed air into the uppermost chamber 114 flows around the annular body 111 of the support member 110 and flows into the lower second chamber 114 through the cut-out 113a which is formed in the uppermost annular fin 113 and which is located on the diametrically opposite side. This is repeated so that the compressed air successively flows from the uppermost chamber 114 to the second chamber 114 through the cut-out 113a, to the third chamber 114 through the cut-out 113a, to the fourth chamber 114 through the cut-out 113a, and into the lowermost cut-out 113a. Thus, the compressed air is introduced into the circuitous passage 109 which is arranged within the closed end wall 196 of the base 102. The incoming compressed air into the circuitous passage 109 flows with respect to the radially outermost one of the four peripheral passage segments 108a in the illustrated embodiment. The compressed air from the radially outermost passage segment 108a is introduced into the subsequent passage segment 108a and flows therealong. The compressed air flows into the subsequent passage segment 108a through the cut-out 108b. In this connection, the radially outermost cut-out is not shown. This is repeated so that the compressed air successively flows into the first-stage passage segment 108a, the cut-out 108b, the second-stage passage segment 108a, the cut-out 108b, the third-stage passage segment 108a, the cut-out 108b, and the fourth-stage passage segment 108a. The compressed air is introduced into the oil-mist separator 150 through the central bore 111a in the lower wall of the support member 110.

Oil in the compressed air adheres to the mesh element 117 within the oil-mist separator 150 so that the oil is removed from the compressed air. The compressed air, from which the oil is removed, flows toward the desiccant container 130. The compressed air, from which the oil is removed, passes through the oil filter 137 within the desiccant container 130 so that the oil is further removed from the compressed air. The compressed air, from which the oil is further removed, flows through the desiccant material 142 within the desiccant container 130 so that moisture or water is removed from the compressed air. Subsequently, the check valve 144 is opened so that the compressed air reaches the air receiving cavity 134. The compressed air within the air receiving cavity 134 is supplied to the air reservoir 192 as dry compressed air from which the oil and moisture are removed. The compressed air is utilized as pressure for the brake circuit.

In a series of movements of the compressed air, the compressed air passes through the plurality of chambers 114 and the circuitous passage 109 until the compressed air flows into the oil-mist separator 150. Further, the chambers 114 and the circuitous passage 109 are curved or bent, and the compressed air is into contact, at a relatively large area, with the inner peripheral surface of the tubular section 105 of the base 102, the annular fins 113 and so on. Accordingly, water droplets and oil droplets contained in the compressed air adhere to the inner peripheral surface of the tubular section 105 and the annular fins 113, or water and oil in the form of mist also adhere to the inner peripheral surface of the tubular section 105 and the annular fins 113. Thus, it is possible to prevent the water and oil from invading directly into the oil-mist separator 150. Moreover, the compressed air is sufficiently cooled by heat exchange which is conducted between the compressed air and the tubular section 105. Thus, the moisture contained in the compressed air is condensed so that the removing efficiency is promoted. Particularly fine or minute oil mist is further removed, by the mesh element 117, from compressed air introduced into the oil-mist separator 150 after going through the above process. Thus, the oil can effectively be removed from the compressed air flowing toward the desiccant container 130.

Subsequently, when the pressure within the main tank reaches the first predetermined value, the governor is switched so that the air compressor 191 is brought to its unload condition, and the compressed air is supplied to the port 120. Thus, the dump valve 107 is opened so that the compressed air within the recess 194 is discharged at a breath to the ambient atmosphere. At this time, drain, that is, a mixture of oil and water, which is accumulated at the recess 194 is discharged toward the ambient atmosphere. At the same time, the compressed air within the desiccant container 130 also flows backward through the oil filter 137 and the mesh element 117, and is discharged at a breath to the ambient atmosphere. At this time, the compressed air moves toward the dump valve 107 such that oil adhering to the oil filter 137 and the mesh element 117 is blown off. Thus, the oil filter 137 and the mesh element 117 are regenerated. Subsequently, when the desiccant container 130 and the bore 106 or the interior of the annular section 105 of the base 102 are abruptly depressurized, the compressed air within the air receiving cavity 134 begins to flow backward through the restriction 145. The compressed air, which is adiabatic-expanded after having passed through the restriction 145, flows backward through the desiccant material 142, while the latter 142 removes the water contained in the compressed air. The compressed air is discharged from the dump valve 107 to the ambient atmosphere. When a predetermined time elapses, the compressed air within the gas receiving cavity 134 is spent as a whole for regeneration of the desiccant material 142, so that regeneration is completed.

After completion of the regeneration, the pressure within the main tank is reduced to the second predetermined value by consumption or spending at the brake circuit, the governor is switched to the exhaust position so that the air compressor 191 is loaded. The dump valve 107 of the compressed-air dryer 100 is closed so that drying is resumed or reopened.

In connection with the above, in order to improve the radiator performance, a mesh material or element may be filled between the chambers 114 and the tubular section 105 of the base 102 to ensure that heat is transmitted to the ambient atmosphere. Thus, the peripheral edges of the respective annular fins 113 are physically in contact with the tubular section 105.

Figure 2:
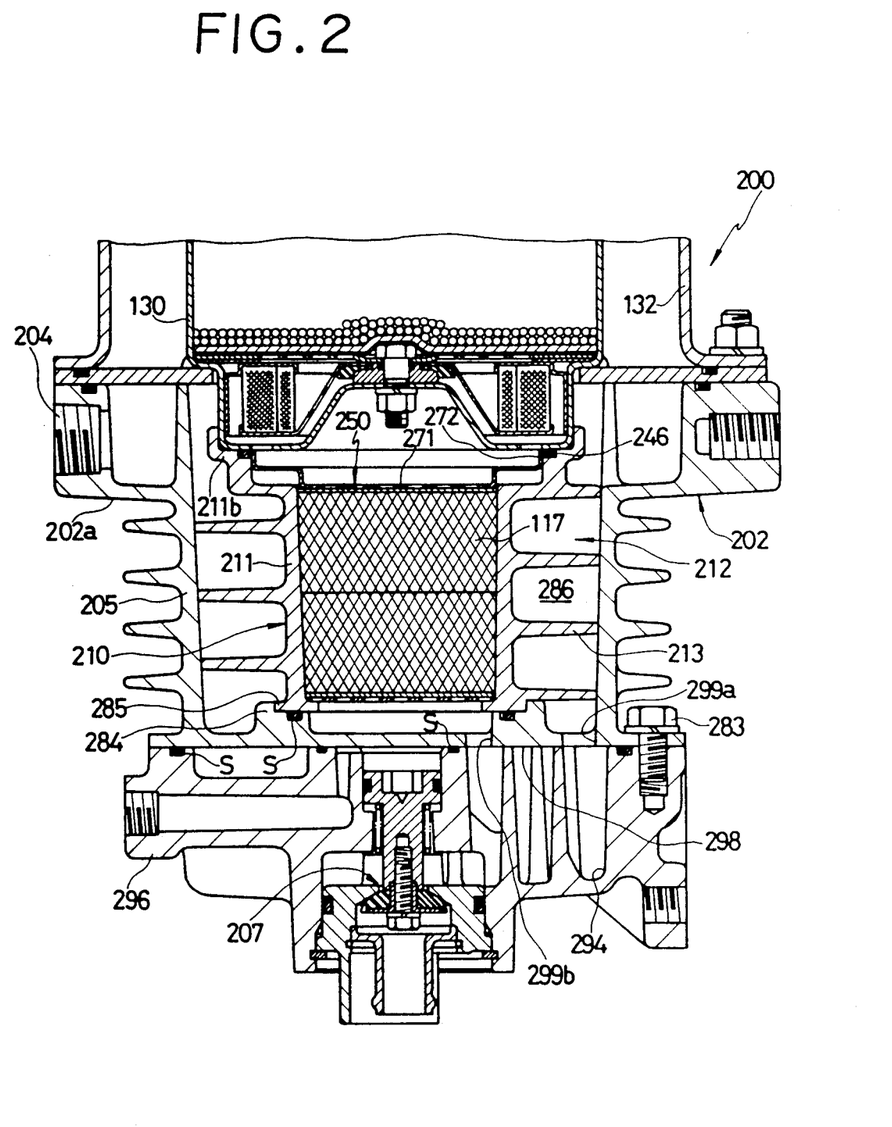
FIG. 2 is a fragmentary cross-sectional view of a compressed-air dryer according to a second embodiment of the invention.

Referring to FIG. 2, there is shown a compressed-air dryer, generally designated by the reference numeral 200, according to a second embodiment of the invention. The compressed-air dryer 200 is similar in many respects as the compressed-air dryer 100 according to the first embodiment, and only differences will be described below. In this connection, in FIG. 2, components and parts like or similar to those illustrated in FIG. 1 are designated by the same or like reference numerals.

In FIG. 2, there are three respects which are largely different from the compressed-gas dryer 100 illustrated in FIG. 1.

The first respect is a construction on or above an oil-mist separator 250. That is, a step 211b is formed at the upper end of a tubular body 211 of a support member 210. The step 211b is abutted against the lower end of the desiccant container 130. A perforated plate 271 is abutted directly against the lower end of the desiccant container 130 through an annular section 272 of the perforated plate 271 to retain the mesh element 117. A seal element 246 is supported between the annular section 272 and the step 211b at the upper end of the annular body 211 of the support member 210.

The second respect is a construction below the oil-mist separator 250. A tubular section 205 of an end cover or a base 202 has a lower end wall 298 which is located adjacent a dump valve 207. The end wall 298 has therein a first opening 299a through which a transport cavity 212 communicates with an annular recess 294, and a plurality of second openings 299b through which the annular recess 294 communicates with the lower end of the oil-mist separator 250. The base 202 includes a tubular body 202a which has an inlet port 204 and the tubular section 205. The base 202 further includes a cap member 296 which is detachably mounted to the end wall 298 of the tubular section 205. The tubular body 202a and the cap member 296 are coupled with each other by a plurality of screws 283. Accompanied with this, the oil-mist separator 250 rests on the bottom of the tubular body 202a through a seal element S. Further, an annular recess 284 is formed at the inner surface of the end wall 298, while an annular projection 285 is formed at the lower end of the tubular body 211 of the support member 210. The annular projection 285 is fitted in the annular recess 284. By the annular recess 284 and the annular projection 285, the support member 210 and the oil-mist separator 250 are located in their respective positions. The cap member 296 has defined therein the annular recess 294. The dump valve 207 is incorporated in the cap member 296.

The third respect is as follows. The support member 210 has a helical fin 213 which extends radially outwardly from the tubular body 211 toward the tubular section 205 of the base 202 perpendicularly to an axis of the tubular body 211. The helical fin 213 has no cut-outs therein. The helical fin 213 extends helically about the annular body 211 as a whole to form the transport cavity 212 into a continuous helical passage 286 which has one end communicating with the inlet port 204 and the other end communicating with the recess 294. By the helical passage 286, the compressed air flows helically to remove oil droplets and so on therefrom under a centrifugal force.

Figure 3:
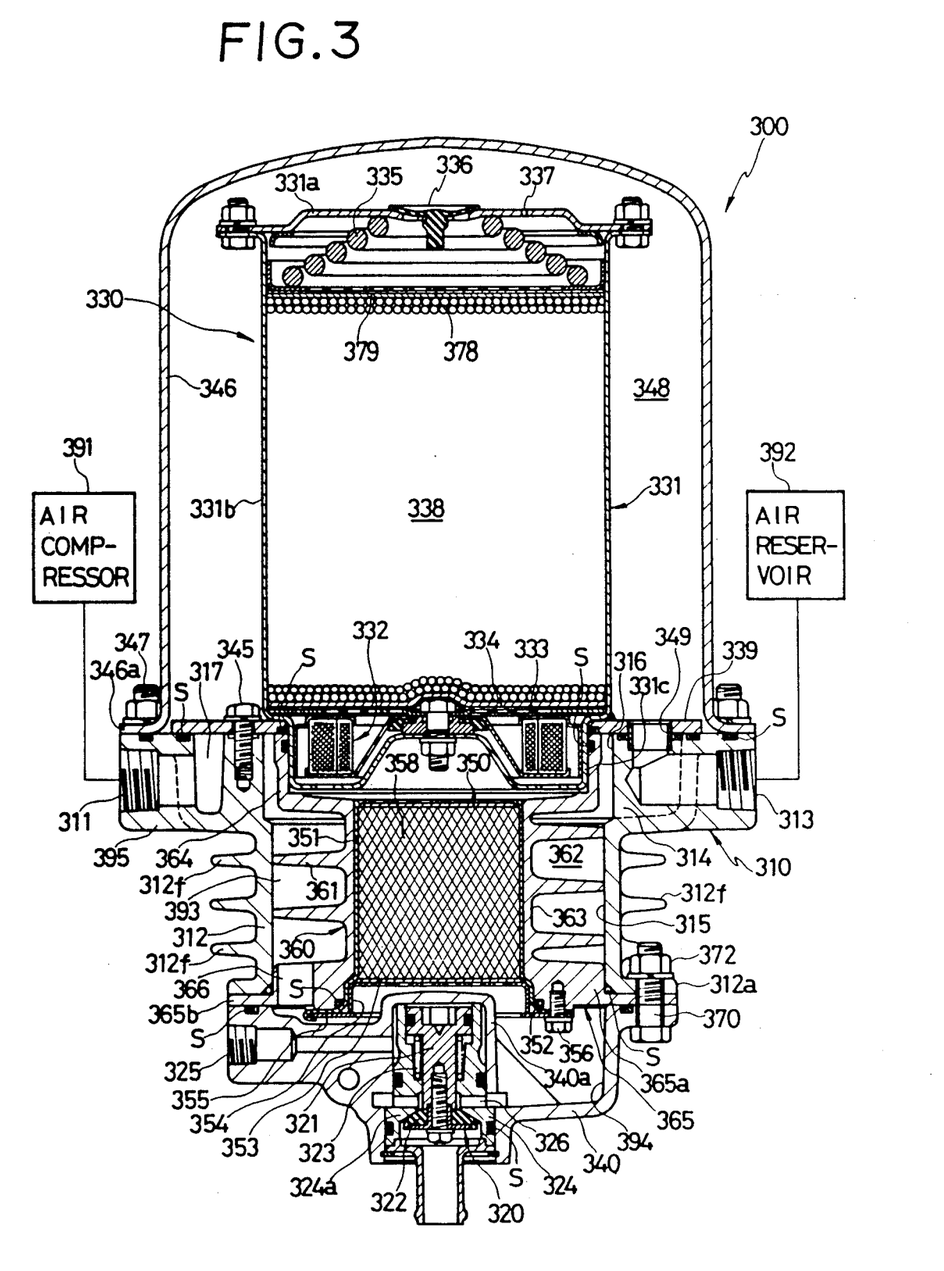
FIG. 3 is a view similar to FIG. 1, but showing a compressed-air dryer according to a third embodiment of the invention.

Referring to FIG. 3, there is shown a compressed-air dryer, generally designated by the reference numeral 300, according to a third embodiment of the invention.

The compressed-air dryer 300 comprises a housing 346 having an open end. A desiccant container 330 is arranged within the housing 346 and cooperates with the latter to define an air receiving cavity 348 therebetween. The desiccant container 330 has accommodated therein regenerable desiccant material 338. An end cover or a base 310 has one end thereof which is mounted to the open end of the housing 346 to close the latter. The base 310 has formed therein a recess 394 at the other end thereof and has an inlet port 311 which is connected to an air compressor 391 of a pneumatic pressure circuit and which communicates with the recess 394. The inlet port 311 is formed in the lateral side of the base 310. An outlet port 313 connected to an air reservoir 392 of the pneumatic pressure circuit is also formed in the lateral side the base 310 at a location which is diametrically opposite to the inlet port 311. The outlet port 313 communicates with the air receiving cavity 348 so that air after having passed through the desiccant container 330 is discharged from the air receiving cavity 348 to the air reservoir 392 through the outlet port 313. The base 310 is a molded article which is made of material high in heat conductivity such as aluminum or its alloy.

The base 310 serves also as a mounting table for the desiccant container 330, and a part of the base 310 is utilized to mount the compressed-air dryer 300 to a fixing section of a vehicle. The base 310 includes a tubular body 395 having the inlet port 311. The tubular body 395 has a tubular section 312 coaxial with the housing 346. The tubular section 312 has an inner peripheral surface which defines a bore 315 having both open ends.

An oil-mist separator 350 is arranged between the desiccant container 330 and a dump valve 320 subsequently to be described. The oil-mist separator 350 has one end thereof communicating with the inlet port 311 of the base 310 through the recess 394 therein. The oil-mist separator 350 has the other end communicating with the desiccant container 330. A support member 360 for supporting the oil-mist separator 350 has a tubular body 363 which is concentric with the tubular section 312 of the base 310. The tubular body 363 of the support member 360 cooperates with the tubular section 312 to define therebetween a transport cavity 393 which is annular in shape. The oil-mist separator 350 is received within the tubular body 363. That is, the oil-mist separator 350 removes oil in compressed air flowing from the air compressor 391 toward the desiccant container 330 through the inlet port 311 and the recess 394. The inlet port 311 communicates with the oil-mist separator 350 through the transport cavity 393 and the recess 394. A cap member 340 is detachably mounted to the open end of the tubular section 312. The cap member 340 has defined therein the recess 394. The cap member 340 has its open end which is located adjacent the oil-mist separator 350. The open end of the cap member 340 is detachably mounted to the open end of the tubular section 312 of the base 310.

The aforementioned dump valve 320 is incorporated in the cap member 340. That is, the dump valve 320 is arranged at the other end of the base 310 for causing the recess 394 in the cap member 340 to communicate with the ambient atmosphere in response to a command from the outside.

The tubular section 312 has its portion which is smaller in diameter than its portion 314 which is formed therein with the inlet port 311 and the outlet port 313. The bore 315 defined by the inner peripheral surface of the tubular section 312 of the base 310 is substantially uniform in diameter along an axis of the tubular section 312. An annular flange 312a is formed at the lower end of the tubular section 312 and extends radially outwardly. The bore 315 is open at the annular flange 312a. Further, the bore 315 has its upper end which communicates with a central bore 316 at the larger-diameter portion 314 of the base 310. The central bore 316 communicates with the inlet bore 311 through a communication passage 317.

The bores 316 and 315 cooperate with the tubular body 363 of the support member 360 to define the transport cavity 393 for removing relatively large water droplets and oil droplets from compressed air entering through the inlet port 311. The more the transport cavity 393 is circuitous or complicated, and the more the transport cavity 393 is high in heat exchange, the higher the removing efficiency is for the water droplets and the like. In view of this, in order to improve heat exchange, the transport cavity 393 extends along the inner peripheral surface of the tubular section 312, and a plurality of substantially annular cooling fins 312f are formed on the outer peripheral surface of the tubular section 312. Cutouts are formed respectively in the cooling fins 312f. The cooling fins 312f are spaced from each other along an axis of the tubular section 312. The cooling fins 312f extend radially outwardly from the entire outer peripheral surface of the tubular section 312 perpendicularly to the axis thereof. The cooling fins 312f extend in parallel relation to each other. Particularly, the tubular section 312 and the cooling fins 312f of the base 310 are integrally molded and are made of aluminum or its alloy. Similarly to the first embodiment illustrated in FIG. 1, the cooling fins 312f may be discontinuous. Further, it is of course that a single helical fin may be substituted for the plurality of cooling fins 312f. In this case, the helical fin extends helically about the outer peripheral surface of the tubular section 363 of the base 310.

A helical cooling fin 361 is formed on the outer peripheral surface of the tubular body 363 of the support member 360. The helical fin 361 extends radially outwardly from the tubular body 363 toward the tubular section 312 of the base 310 perpendicularly to an axis of the tubular body 363 of the support member 360. The helical fin 361 extends continuously and helically about the annular body 363 of the support member 360 to form the transport cavity 393 into a continuous helical passage 362 which has one end communicating with the central bore 316 and the inlet port 311 through the communication passage 317. The helical passage 362 has the other end communicating with the recess 394. The tubular body 363 and the helical fin 361 are integrally molded and are made of aluminum or its alloy. The transport cavity 393 extending along the inner peripheral surface of the tubular section 312 may be formed in the base 310 per se.

In addition to the tubular body 363 which is relatively small in diameter, the support member 360 has a dish-shaped section 364 which extends upwardly from the upper end of the tubular body 363 and which is relatively large in diameter. The support member 360 also has an annular flange 365 which extends radially outwardly from the lower end of the tubular body 363. The upper dish-shaped section 364 is used for supporting the desiccant container 330. The intermediate tubular body 363 serves as a housing for the oil-mist separator 350. The lower annular flange 365 is used for supporting the support member 360 per se. The annular flange 365 has its configuration which is in conformity with the radially outward flange 312a at the lower end of the tubular section 312. A section 365a of the support member 360, which is located radially inwardly of the annular flange 365, is fitted in the bore 315 in the tubular section 312. A radially outward section 365b of the annular flange 365 is in contact with the radially outward flange 312a at the lower end of the tubular section 312.

The end cap 340, to which the dump valve 320 is incorporated, closes the opening at the lower end of the tubular section 312. The end cap 340 is mounted to the tubular section 312 by means of bolts 370 and nuts 372 under such a condition that the radially outward section 365b of the annular flange 365 of the support member 360 is clamped between the open end of the cap member 340 and the radially outward flange 312a of the tubular section 312. Mounting means for the cap member 340 is not limited to the bolts 370 and the nuts 372, but it is necessary that the mounting means is detachable means utilizing screws or the like. In this connection, the bolts, the nuts and so on may be arranged in their respective directions which are reverse or opposite to those illustrated in FIG. 3, in order to facilitate tightening and loosening of the bolts and the nuts as the case may be.

The cap member 340 has a casing section 340a within which the dump valve 320 is received. The casing section 340a is located at the center of the cap member 340 and has an upper portion which is closed. The dump valve 320 comprises a valve element 322 which is moved together with a control piston 321. The control piston 321 is normally biased upwardly under a biasing force of a coil spring 323 to about the valve element 322 against a valve seat 324a which is formed on a plug 324. When a control signal is sent through a passage or port 325 communicating with a pressure governor, however, the control piston 321 moves downwardly to move the valve element 322 away from the valve seat 324a. Thus, the dump valve 320 discharges, to the ambient atmosphere, drain such as a mixture of water and oil accumulated on the outside of the housing 340a, through a passage 326. Such drain includes water and oil removed during passage of the compressed air through the helical passage 362, and foreign matter removed by the oil-mist separator 350. The removed water and oil flow onto the cap member 340 through a bore 366 formed at the lower end of the support member 360, or through an opening at the lower end of the support member 360. In this connection, the dump valve 320 serves as a valve for discharge of the drain, and serves also as an open valve to the outside for a regeneration cycle of the desiccant material 338 within the desiccant container 330.

At maintenance of the compressed-air dryer 300, replaced periodically are the desiccant material 338 within the desiccant container 330 and a mesh element 358 within the oil-mist separator 350. In the compressed-air dryer 300, the desiccant material 338 can be replaced through the upper open end of the end cap 310, and the mesh element 358 can be replaced through the lower open end of the end cap 310.

The desiccant container 330 has a casing 331 and a filter element 332 in the form of a ring which is located at the bottom of the casing 331. A perforated plate 333 and a felt 334 rest on the filter element 332. A layer of the particulate desiccant material 338 rests on the upper end of the felt 334. A felt 379 and a perforated plate 378 rests on the layer of the desiccant material 338. The perforated plate 378 is urged against the felt 379 by a coil spring 335. A cap 331a of the casing 331, which supports the upper end of the coil spring 335, is removable or detachable with respect to a body 331b of the casing 331. Thus, it is possible to replace only internal components such as the desiccant material 338 and the like. Further, it is also possible to replace the entirety including the casing 331. A check valve 336 and a restriction passage 337 for the regeneration cycle are provided on or in the cap 331a.

The casing 331 of the desiccant container 330 has, at its bottom, a section 331c which is small in diameter. A support plate 339 is fitted about the small-diameter section 331c. The support plate 339 is united with the casing 331 by spot welding. Thus, the support plate 339 is mounted to the upper surface of the end cap 310 by means of attaching screws 345, whereby the desiccant container 330 is supported on the end cap 310. At this time, since the small-diameter section 331c of the casing 331 is inserted in the dish-shaped section 364 at the upper end of the support member 360, there is provided a stable support form.

The housing 346 covers the desiccant container 330. The housing 346 is larger in diameter than the casing 331 of the desiccant container 330. The housing 346 has a radially outward annular flange 346a which is fixedly mounted to the upper surface of the end cap 310 by means of detachable attaching means 347 such as bolts and nuts or the like. The housing 346 cooperates with the casing 331 to define the air receiving cavity 348 therebetween. The air receiving cavity 348 serves as a purge chamber, and communicates, on one hand, with the interior of the casing 331 through the restriction passage 337 and, on the other hand, with the outlet port 313 through a bush 349.

In case where the desiccant container 330 is replaced with new one, the housing 346 is removed and, subsequently, the attaching screws 345 are detached or demounted. Thus, it is possible to remove the desiccant container 330 per se from the end cap 310. During the replacement of the desiccant container 330, the operation can be done without detachment of lines extending respectively from the inlet port 311 and the outlet port 313, and regardless of the oil-mist separator 350.

Furthermore, the oil-mist separator 350 is received within the support member 360. The oil-mist separator 350 is located midway of a passage extending from the inlet port 311 to the desiccant container 330, and removes water and oil, particularly, oil mist, which are not removed at the helical passage 362, by a trap action of the mesh element 358. The mesh element 358 of the oil-mist separator 350, is a metallic material or crushed aluminum. In this third embodiment, the mesh element 358 is received in a cup-shaped casing 351, and the cup-shaped casing 351 is received within the tubular body 363 of the support member 360. The casing 351 has a lower end which is open, and an annular flange 352 is formed at the lower open end. The annular flange 352 is utilized to mount the casing 351 to the support member 360. Giving attention to the open end of the casing 351, a felt 353 covers the mesh element 358 which is filled within the casing 351. The felt 353 is supported by a dish-shaped perforated plate 354. The perforated plate 354 is pressed by a ring plate 355. The oil-mist separator 350 is arranged such that the ring plate 355 is mounted, together with the annular flange 352 of the casing 351, to the annular flange 365 of the support member 360 by means of attaching screws 356 or the like. The arrangement may be such that the flange 352 of the casing 351 extends or is lengthened radially outwardly, and the extending portion of the flange 352 is clamped between the end cap 340 and the tubular section 312.

In the compressed-air dryer 300, since the cap member 340 is detachable, removal of the cap member 340 enables the oil-mist separator 350 to be demounted from the lower end of the tubular section 312. Particularly, in the third embodiment illustrated in FIG. 3, the cap member 340 and the support member 360, which serves as a housing for the oil-mist separator 350, are mounted by common attaching means 370 and 372. Accordingly, it is possible to remove the cap member 340 and the oil-mist separator 350 simultaneously from the tubular section 312. With regard to the oil-mist separator 350 removed from the cap member 340, it is also possible to replace the internal mesh element 358 together with the cup-shaped casing 351 by detachment of the attaching screws 356.

In FIG. 3, various seal elements are designated by the reference characters S, similarly to the first embodiment illustrated in FIG. 1.

Figure 4:
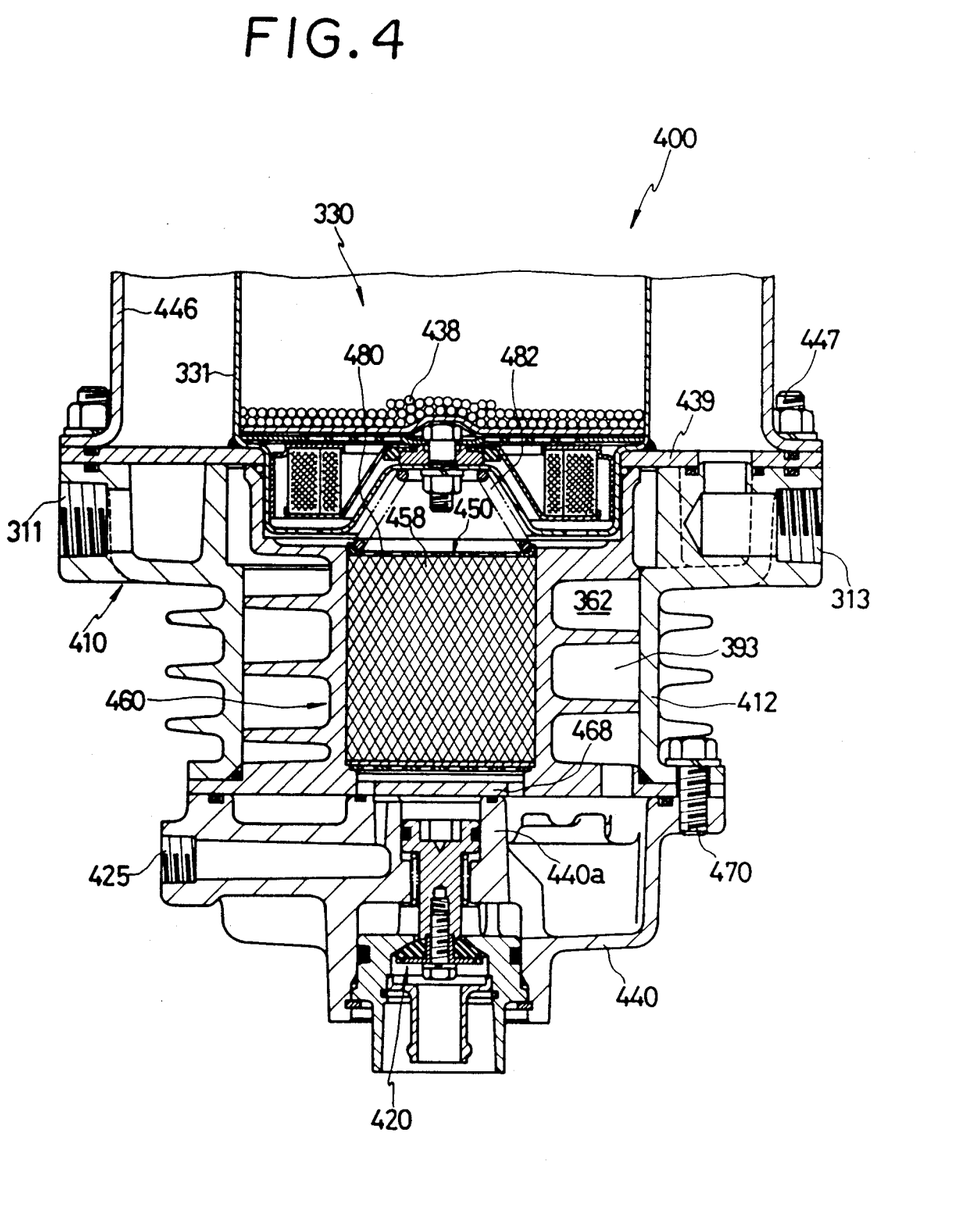
FIG. 4 is a view similar to FIG. 2, but showing a compressed-air dryer according to a fourth embodiment of the invention.

Referring to FIG. 4, there is shown a compressed-air dryer, generally designated by the reference numeral 400, according to a fourth embodiment of the invention. The compressed-air dryer 400 is similar in many respects as the compressed-air dryer 300 according to the third embodiment, and only differences will be described below. In this connection, in FIG. 4, components and parts like or similar to those illustrated in FIG. 3 are designated by the same or like reference numerals.

In the fourth embodiment illustrated in FIG. 4, a cap member 440 of a end cover or a base 410, to which a dump valve 420 is mounted, is detachable with respect to a tubular section 412 of the base 410. The fourth embodiment is different from that according to the third embodiment illustrated in FIG. 3 as follows.

First, as attaching means for the cap member 440, a screw 470 is used. Because of the screw 470, the nuts 370 illustrated in FIG. 3 are unnecessary or dispensed with.

Secondly, the dump valve 420 has a housing 440a whose upper end is open on the side of the tubular section 412. A closure section 468 for covering or closing the upper end of the cap member 440 is provided on a lower end of a support member 460. Further, in response thereto, a port 425 communicating with the pressure governor also changes in configuration.

Thirdly, a support structure for a mesh element 458 of an oil-mist separator 450 is different from that of the third embodiment illustrated in FIG. 3. Since the bottom of the support member 460 is substantially closed, the mesh element 458 is filled within the support member 460 without the use of the casing 351 illustrated in FIG. 3. Moreover, in order to press the filled mesh element 458, used are a perforated plate 480 and a coil spring 482.

Fourthly, a support plate 439 is enlarged in its diameter so that the support plate 439 and a housing 446 are mounted to each other by common attaching means 447.

In the fourth embodiment illustrated in FIG. 4, there are obtained functional advantages the same as those of the third embodiment illustrated in FIG. 3, regarding replacement of the desiccant material 438 and the mesh element 458.

The preferred embodiments of the invention have been described above. In view of connection of various lines to the air compressor, however, a first inlet port may be provided in the housing 132, 346 or 446, and may be connected to a second inlet port which is formed in the base 102, 202, 310 or 410 for reasons of the connection of the various lines. In this case, however, it is constant that the inlet port communicating with the air compressor is provided in the base. For the same reason, the outlet port 135 or 313 may be formed in one or both of the housing 132, 346 or 446 and the base 102, 202, 310 or 410. Further, the housing 132, 346 or 446 may be arranged at an end of the desiccant container 130 or 330 opposite to an end thereof which is located at the oil-mist separator 150, 250, 350 or 450. In this case, it is of course that an air receiving cavity corresponding to the air receiving cavity 134 or 348 is defined between the housing 132, 346 or 446 and the desiccant container 130 or 330. Moreover, the housing 132, 346 or 446 may be composed of a pair of upper and lower housing sections. In this case, the desiccant container 130 or 330 has the desiccant material 142 or 338 which is received within the lower housing section, while the upper housing section serves as a tank portion within which the air receiving cavity 134 or 348 is defined. Furthermore, a tank, within which the air receiving cavity 134 or 348 is defined, may be provided separately from the housing 132, 346 or 446, the desiccant container 130 or 330 and the base 102, 202, 310 or 410.

What is claimed is:

1. A compressed-air dryer for use in a pneumatic pressure circuit having an air compressor and an air reservoir, said compressed-air dryer comprising:
   a desiccant container having accommodated therein regenerable desiccant material;
   base means having formed therein a recess at one end thereof;
   inlet port means connected to said air compressor of said pneumatic pressure circuit and communicating with said recess;
   outlet port means through which air after having passed through said desiccant container is discharged to said air reservoir of said pneumatic pressure circuit;
   dump valve means arranged at said one end of said base means for causing said recess in said base means to communicate with the ambient atmosphere in response to a command from the outside; and
   an oil-mist separator arranged between said desiccant container and said dump valve means, said oil-mist separator having one end thereof communicating with said inlet port means through said recess therein, said oil-mist separator having the other end communicating with said desiccant container, in which said oil-mist separator removes oil in compressed air flowing from said air compressor toward said desiccant container through said inlet port means and said recess,
   wherein said base means has a tubular section, said oil-mist separator being received within said tubular section and cooperating with the latter to define a transport cavity therebetween,
   wherein said inlet port means communicates with the one end of said oil-mist separator through said transport cavity and said recess,
   a support member being arranged within said tubular section of said base means, for supporting said oil-mist separator, said support member having a tubular body which is concentric with said tubular section of said base means, said tubular body cooperating with said tubular section to define therebetween said transport cavity which is annular in shape, said oil-mist separator being received within said tubular body of said support member,
   fin means being arranged at said transport cavity, said fin means extending from said tubular body of said support member radially outwardly toward said tubular section of said base means perpendicularly to an axis of said tubular body, said fin means cooperating with an inner peripheral surface of said annular section and an outer peripheral surface of said tubular body to form said transport cavity into a continuous passage having one end thereof communicating with said inlet port means and the other end communicating with said recess, and
   wherein the compressed air introduced through said inlet port means flow along said continuous passage and is transported toward said recess.

2. The compressed-air dryer according to claim 1, further including a circuitous passage defined in said recess in said base means, said inlet port means communicating with the one end of said oil-mist separator through said transport cavity and said circuitous passage.

3. The compressed-air dryer according to claim 1, wherein said desiccant container comprises an oil filter which is arranged within said desiccant container at a bottom thereof adjacent said dump valve means.

4. The compressed-air dryer according to claim 1, wherein said base means includes a tubular body having said inlet port means and said tubular section and a cap member, wherein said tubular section of said base means has an end wall which is located adjacent said cap member, wherein said cap member being detachably mounted to the end wall of said tubular section, said cap member having defined therein said recess, and wherein said end wall having therein first opening means through which said transport cavity communicates with said recess, and second opening means through which said recess communicates with the one end of said oil-mist separator, said dump valve means being incorporated in said cap member.

5. The compressed-air dryer according to claim 1, wherein said fin means has a helical fin which extends radially outwardly from said tubular body toward said tubular section of said base means perpendicularly to an axis of said tubular body, said helical fin extending helically about said annular body to form said transport cavity into a helical passage which has one end communicating with said inlet port means and the other end communicating with said recess.

6. The compressed-air dryer according to claim 1, including a support plate for supporting a bottom of said desiccant container, said support plate being arranged at said one end of said base means, wherein said desiccant container is mounted to and dismounted from said base means from a first location on one side of said support plate which is remote from said base means, and wherein said oil-mist separator is mounted to and dismounted from said base means from a second location on the other side of said support plate which is adjacent said base means, said first location being opposite to said second location with respect to said support plate.

7. The compressed-air dryer according to claim 1, wherein said fin means has a plurality of annular fins which are spaced from each other along the axis of said tubular body of said support member, said annular fins extending radially outwardly from said tubular body toward said tubular section of said base means, said annular fins cooperating with the inner peripheral surface of said annular section to divide said transport cavity into a plurality of chambers which communicate with each other, and wherein a first one of said chambers, which is located adjacent said desiccant container, communicates with said inlet port means, while a last one of said chambers, which is located adjacent said dump valve means, communicates with the one end of said oil-mist separator through said recess.

8. The compressed-air dryer according to claim 7, wherein said annular fins extend in parallel relation to each other.

9. The compressed-air dryer according to claim 7, wherein said tubular body and said annular fins of said support member are integrally molded and are made of metal.

10. The compressed-air dryer according to claim 7, wherein said annular fins have their respective outer peripheral edges which are in contact with the inner peripheral surface of said annular section of said base means.

11. The compressed-air dryer according to claim 1, wherein said base means has cooling fin means which extends radially outwardly from said tubular section perpendicularly to the axis thereof.

12. The compressed-air dryer according to claim 11, wherein said tubular section and said cooling fin means of said base means are integrally molded and are made of metal.

13. The compressed-air dryer according to claim 1, wherein said base means includes a tubular body having said tubular section and a cap member, wherein said tubular section of said base means has an open end which is located adjacent said cap member and which has an opening, said cap member being detachably mounted to the open end of said tubular section, said cap member having defined therein said recess, said dump valve means being incorporated in said cap member, and wherein, in assembling, said oil-mist separator passes through said opening in the open end of said tubular section and is detachably arranged in position within said tubular section.

14. The compressed-air dryer according to claim 13, wherein said tubular section of said base means is substantially uniform in diameter along an axis of said tubular section.

15. The compressed-air dryer according to claim 13, wherein said outlet port means is formed in said base means.

16. The compressed-air dryer according to claim 1, including a housing having an open end, said desiccant container being arranged within said housing to define an air receiving cavity therebetween, wherein said base means has the other end which is mounted to said open end of said housing to close the latter, wherein said inlet port means is formed in at least one of said housing and said base means, wherein said outlet port means is provided in at least one of said housing and said base means and connected to said air reservoir, wherein said outlet port means communicates with said air receiving cavity so that the air after having passed through said desiccant container is discharged from said air receiving cavity to said air reservoir of said pneumatic pressure circuit through said outlet port means, wherein said tubular section of said base means is coaxial with said housing.

17. The compressed-air dryer according to claim 16, wherein said outlet port means is formed in said housing.

* * * * *